Oct. 18, 1966  C. C. DE PEW  3,280,372
GROUNDING MEANS FOR FILLER CAP
Filed Nov. 10, 1964

INVENTOR.
CHESTER C. DE PEW
BY
JOHN P. CHANDLER
HIS ATTORNEY.

United States Patent Office 3,280,372
Patented Oct. 18, 1966

3,280,372
GROUNDING MEANS FOR FILLER CAP
Chester C. De Pew, Farmingdale, N.Y., assignor to
Chester Corporation, Wilton, Conn.
Filed Nov. 10, 1964, Ser. No. 410,069
1 Claim. (Cl. 317—2)

This invention relates to a filler cap and it relates more particularly to a filler cap assembly for fuel tanks for airplanes wherein the critical top surface of the cap, which is exposed to the air, and is substantially flush with the upper surface of the wing, is caused to be grounded in a unique manner, so as to prevent an accumulation of electrical charges from passing through the component parts of a conventional filler cap to the inside of the tank and from there to the adapter which could conceivably cause sparking and then ignite vapors in the fuel tank. In this fashion, any electrical charge capable of causing a spark, produced by static electricity, lightning or any other source, is thus conducted harmlessly to the ground, i.e., to the metal body of the plane which is "ground."

The base plate of the filler cap itself, most generally used for this purpose carries an O ring which contacts an adapter ring stamped from sheet metal and permanently secured to the tank opening by welding or other means. A pressure plate carried by the closure cap has fingers which underlie the edges of the central opening in the adapter ring and when the clamping plate draws the O ring downwardly into firm contact with the adapter ring a hermetic seal is effected.

In the case of an electric charge in this area directly above or adjacent to the cap, caused by static electricity or from any source such as lightning flashes, the electricity might normally be discharged through the hinged handle down through the central pivot mounted on the clamping plate and radially outwardly through this plate, and through the clamping fingers to the adapter. Because all of the mechanical connections or fittings of these parts may not make effective electrical connections, sparking may occur, and since all of these components are in the interior of the tank, disastrous results could follow.

The principal object of the present invention is to provide novel means for grounding the area above the cap and all parts in contact with the base plate of the cap, to the adapter and hence to the aircraft. In accordance with the present invention, a plate made from metal having good electrical conductivity is carried on the upper face of the base plate of the filler cap and it is provided with an annular rim which is downwardly and outwardly inclined and contacts the downwardly and inwardly inclined annular face of the adapter ring in firm, spring-urged relation around its entire perimeter. In an alternative arrangement which can be employed with facility in certain types of closure assemblies and adapters, the grounding plate may be substantially flat clear to its perimeter and firmly engages the upper face of the adapter or it may have the contour of a "Belleville" washer with its convex face uppermost.

In most filler cap assemblies, a handle is pivoted at the upper end of a central stud, which rotates the stud and the clamping plate carried at the lower end thereof, about 30° to cause the clamping fingers which initially pass through slots in the central opening in the adapter ring, to move arcuately an approved distance, so as to underlie the edge of this central opening, thus placing the component parts of the cap in position to be firmly clamped through the clamping plate to the adapter ring. The handle is received in a central recessed section of the base plate component of the filler cap, when the parts are in locked position. When the handle is in vertical or unlocked position and the handle is depressed, a camming surface on the handle pulls the clamping plate upwardly.

This camming surface on the handle operates against a hard metal washer, which is usually recessed slightly below the recess formed for the handle. The grounding plate of the present invention is sandwiched between this hard metal washer and has a contour shaped to contact the upper face of the base plate, and extend into the recess for the pivoted handle and the recess, if any, for the wear plate for the cam on the handle, so that any electrical discharge above any portion of the closure cap is conducted by the grounding plate, to the tank adapter ring and hence the body of the aircraft.

In this first arrangement, the grounding plate is secured to the base plate only at its center and so all portions near the periphery are free to flex upwardly and the diagonally and outwardly inclined rim of the grounding plate, which contacts the annular seat of the adapter at an angle of about 90°, is so proportioned as to length as to be under a bending stress when the filler cap is firmly in place. Hence the rim of the grounding plate, initially in flat engagement with the filler cap, will be flexed upwardly. This arrangement assures firm contact with no gaps around the entire rim of the grounding plate, against the annular seat of the adapter.

Figure 1:
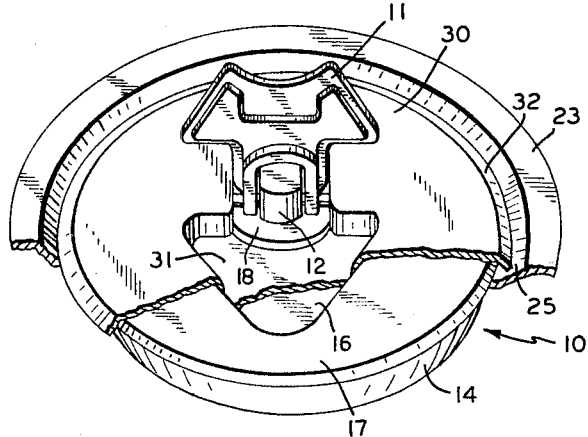
FIG. 1 is a perspective view of a filler cap assembly embodying the present invention.

A filler cap assembly 10 of rather conventional construction is shown in the drawing and includes a base plate 17. The filler cap assembly has a handle 11 pivoted at the opper end of a stud 12 carried by a pressure plate 14. The handle is received in a recess 16 in the upper surface of the base plate 17 and a wear plate or washer 18 is positioned in recess 16 to receive wear from a cam section 19 on the handle 11. The pressure plate has clamping fingers 20, shown in more detail in my Patent No. 2,839,215 which pass through slots 21 in the lower annular rim 22 of an adapter ring which is stamped from sheet metal and suitably secured, as by welding, within an opening in a tank not shown. This adapter ring which is standard for aircraft fuel tanks, has an outer annular section 23 and a diagonally inclined intermediate annular section 25, the lower end of which is engaged by an O ring 26 carried by the base plate 17. When the handle is in the raised position of FIG. 1 the parts are in a position where the clamping pressure has been released and the clamping plate is positioned at its maximum distance below the base plate and the O ring is not under compression.

Figure 2:
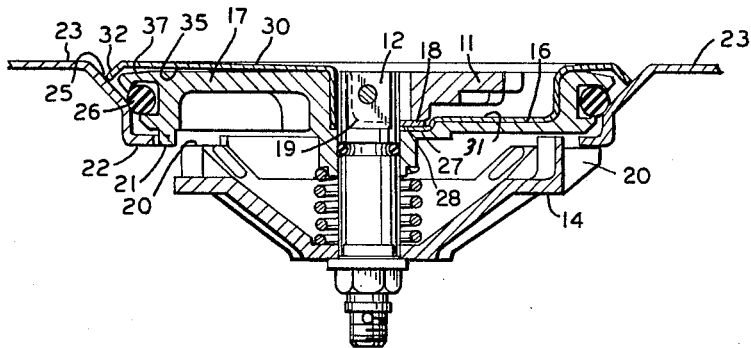
FIG. 2 is a central vertical section taken through the assembly.

When the filler cap assembly is first placed in the adapter, the fingers 20 are disposed in such a position as to pass through slots 21 in the lower rim 22 of the adapter. Partial rotation of the handle and clamping plate is effected to cause the clamping fingers to pass below the rim and away from slots 21. At this point, the handle is in the position of FIG. 1 and when it is rotated downwardly to the position of FIG. 2, the parts are in locked position. Most of the foregoing structure is conventional.

The grounding plate 30 of the present invention may be stamped in a single piece from sheet metal and has a central recess 31 shaped to snugly fit recess 16 in the base plate 17 of the closure cap. At its center, the recess 16 in the filler cap is further recessed as shown at 27 and the grounding plate is downwardly recessed here at 28 to fit the area at 27. The wear plate 18 is on top of this recessed area 27 of the grounding plate and since the wear plate is held against the bottom of the recess 17 by the cam 19, this grounding plate is firmly secured at the center which is the only area of securement necessary. The grounding plate also has a rim 32 which is inclined downwardly and outwardly at an angle of about 45° and is thus approximately perpendicular to the annular diagonal face 25 of the adapter. This rim 32 serves several functions:

(1) It supplies an annular edge that can be easily controlled as to its trueness to assure good peripheral contact with the adapter;

(2) It prevents buckling of the plate when it is flexed at assembly;

(3) It gives a pleasing appearance to the overall assembly and eliminates a shap edge on the outer diameter of the assembly which in turn allows air to flow more freely over the outer surface of the cap;

(4) It makes the plate less susceptible to damage in handling.

When the filler cap is not in the adapter, the lower face of this flat grounding plate is substantially in contact with the upper face 35 of the base plate 17, which latter is invariably given some surface treatment of an insulating nature such as anodizing and/or painting. The length in cross-section of the rim or lip 32 is such that the outer peripheral area of the grounding plate is under an upward bending stress when the cap is in locked relation. Hence, there is a slight separation shown at 37 between the base plate of the cap and the grounding plate. This assures a firm contact between the annular rim 32 and the diagonal annular seat 25 of the adapter and eliminates gaps, supplying a good electrical path for an electric charge to be dissipated from the cap assembly to its adapter, and thence to the body of the aircraft which is ground. Otherwise a spark might occur between the inner annular rim 22 of the adapter and the filler cap fingers 20, which could invite sparks in the inside of the tank.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claim, and that all modifications that come within the meaning and range of equivalency of the claim are intended to be included therein.

What I claim is:

A filler cap assembly for a fuel tank including a centrally recessed filler cap which can be received in an adapter ring secured to a filling opening in the tank and having an annular, diagonal face, sealing means carried by the filler cap which engage the lower end of said diagonal face, and having a pressure plate to compress the sealing means against the annular seat, and a pivoted handle provided with a camming surface at its inner end which, in the act of moving the handle to closed position, raises the pressure plate into sealed relation, said handle received in said recess in the filler cap in flush relation when the assembly is in sealed relation, and a wear plate engaged by said camming surface and, in combination therewith, a grounding plate stamped from sheet metal in a single piece and carried on the upper surface of the filler cap and having a central, downwardly recessed section fitting into the recess for the handle in the filler cap, the inner end of the handle holding the wear plate firmly in the recess, said grounding plate being provided with a downwardly inclined annular rim whose edge contacts the diagonal face of the adapter ring in compressive relation, said downwardly inclined annular rim being normal to said diagonal face, the parts being so proportioned as to cause the outer margin of the grounding plate to flex upwardly when the assembly is in closed position.

References Cited by the Examiner
UNITED STATES PATENTS

| | | | |
|---|---|---|---|
| 2,735,571 | 2/1956 | Lockwood | 220—25 |
| 2,839,215 | 6/1958 | De Pew | 220—25 |
| 3,173,570 | 3/1965 | De Pew | 220—25 X |

MILTON O. HIRSHFIELD, *Primary Examiner.*

LEE T. HIX, *Examiner.*

J. A. SILVERMAN, *Assistant Examiner.*